May 31, 1955
J. F. JAROS
2,709,401
STEREOSCOPIC CAMERA AND VIEWER
Filed Aug. 1, 1952
6 Sheets-Sheet 1
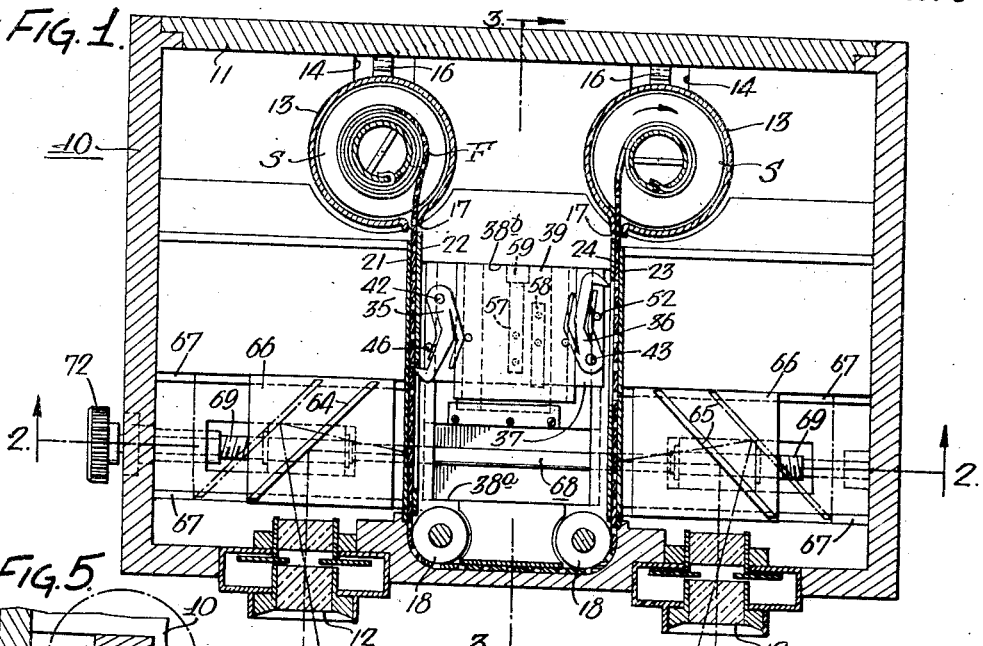
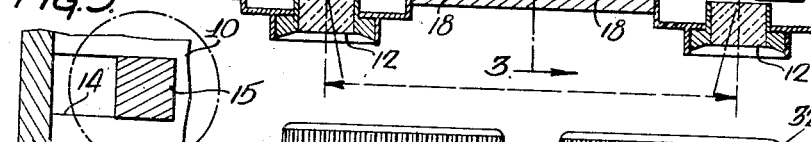
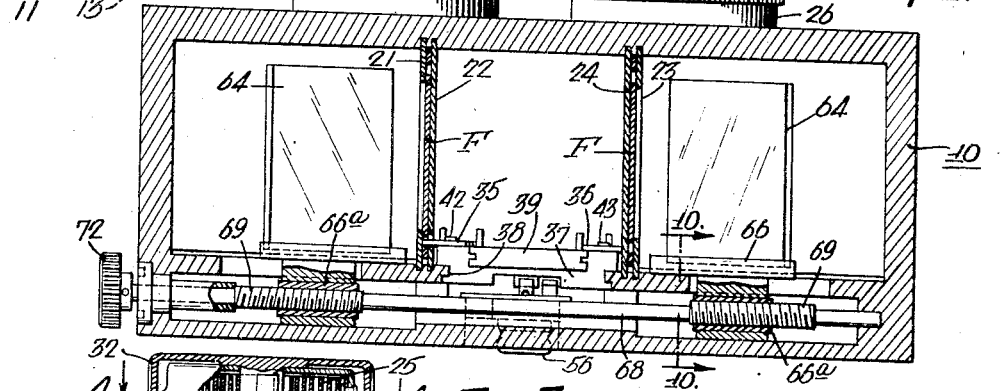
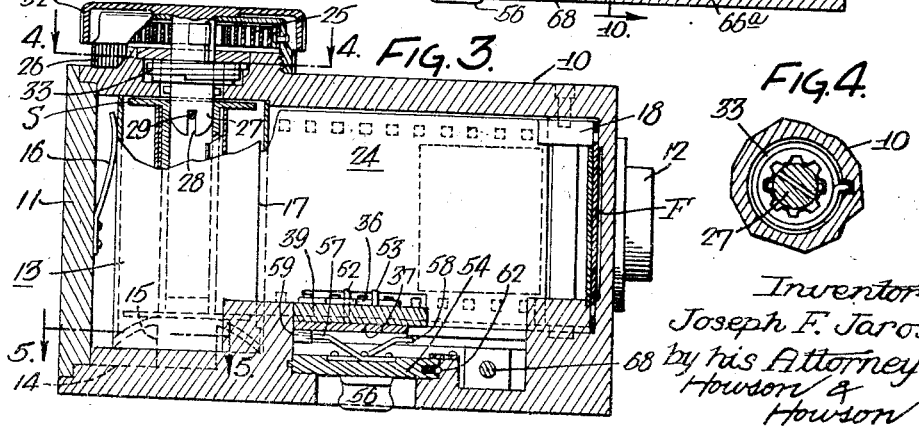
Inventor:
Joseph F. Jaros
by his Attorneys
Howson &
Howson May 31, 1955
J. F. JAROS
2,709,401
STEREOSCOPIC CAMERA AND VIEWER
Filed Aug. 1, 1952
6 Sheets-Sheet 2
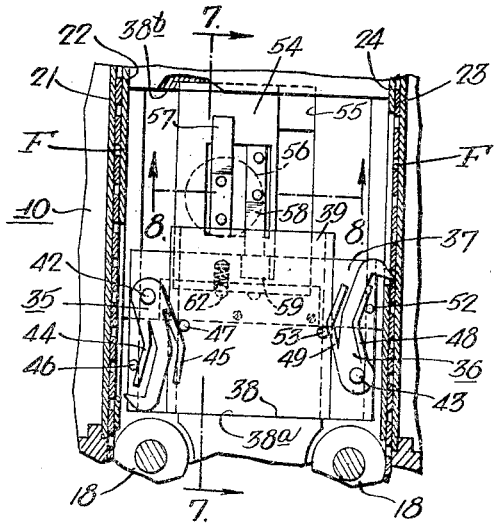
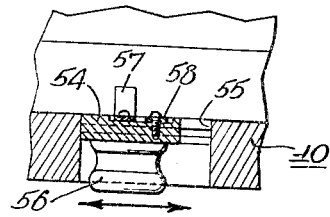
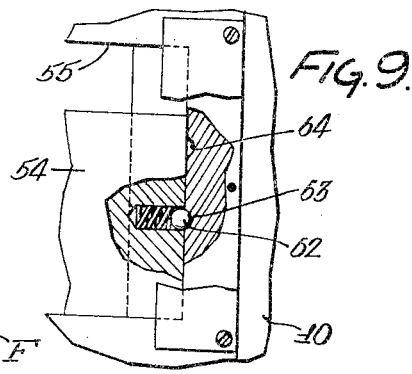
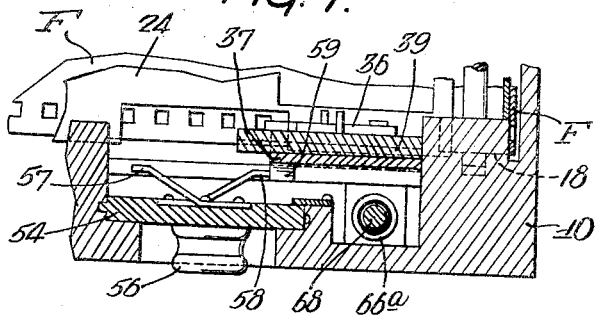
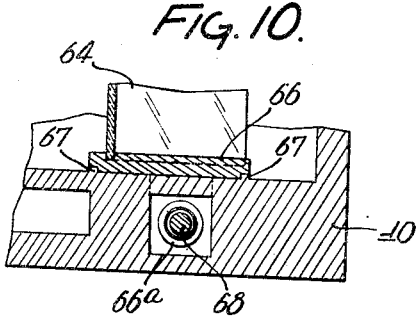
Inventor:
Joseph F. Jaros
by his Attorneys
Howson & Howson

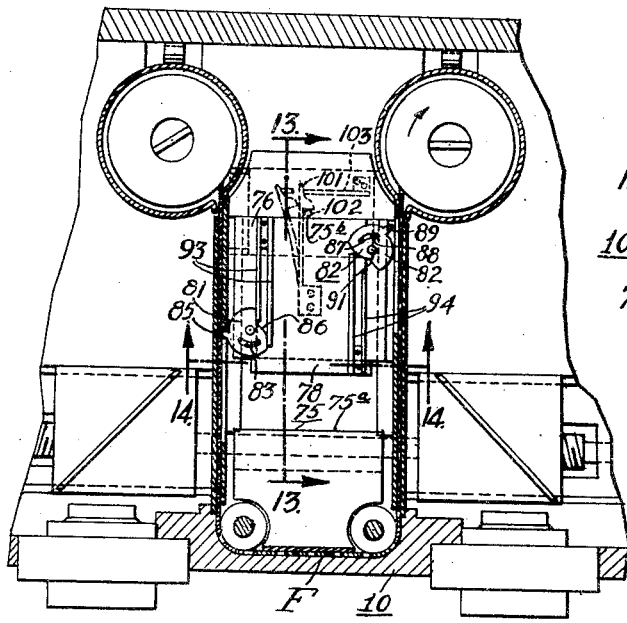
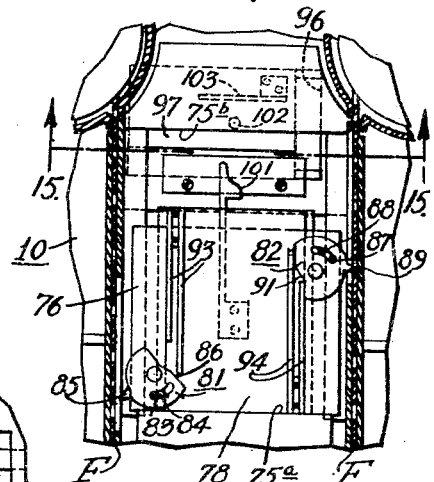
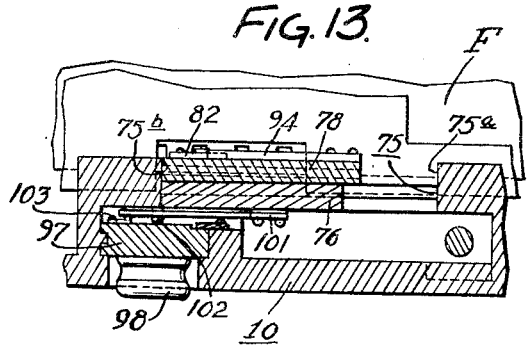
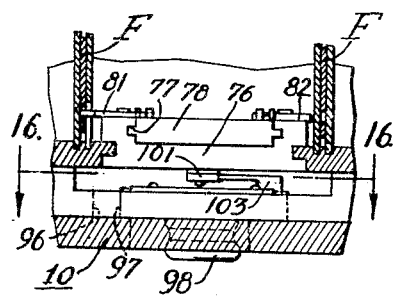
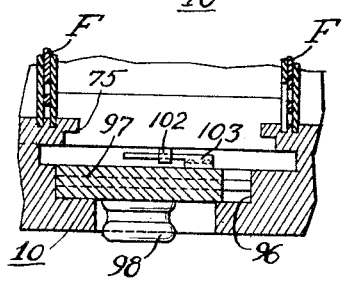

May 31, 1955
J. F. JAROS
2,709,401
STEREOSCOPIC CAMERA AND VIEWER
Filed Aug. 1, 1952
6 Sheets-Sheet 4
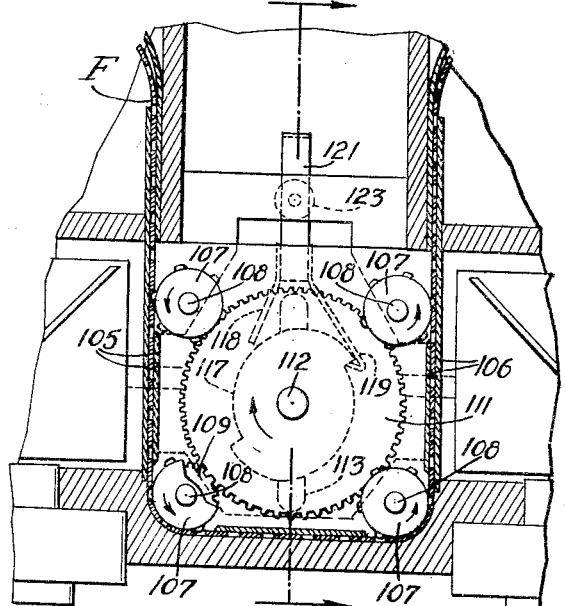
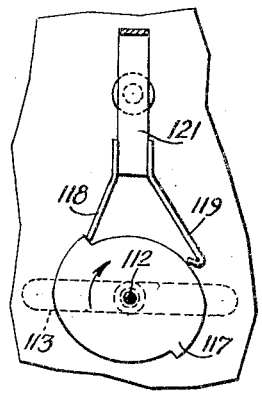
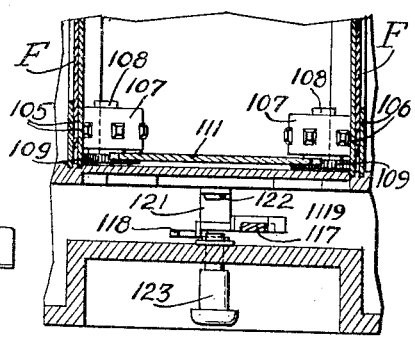
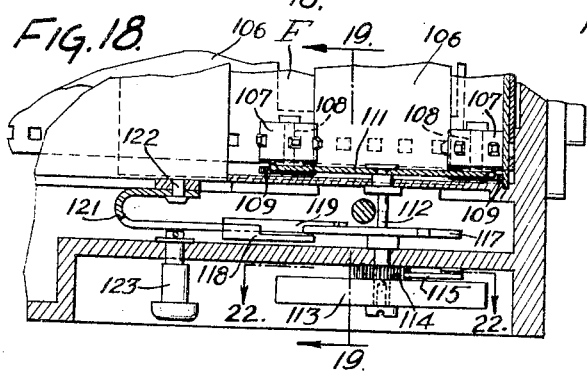
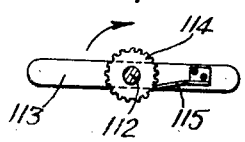
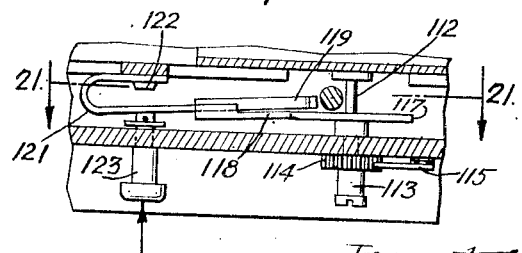
Inventor:
Joseph F. Jaros
by his Attorneys
Howson & Howson May 31, 1955
J. F. JAROS
2,709,401
STEREOSCOPIC CAMERA AND VIEWER
Filed Aug. 1, 1952
6 Sheets-Sheet 5
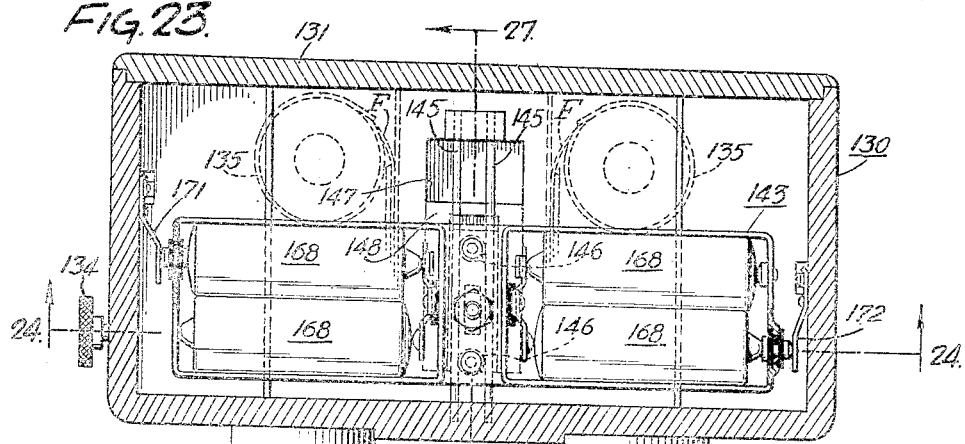
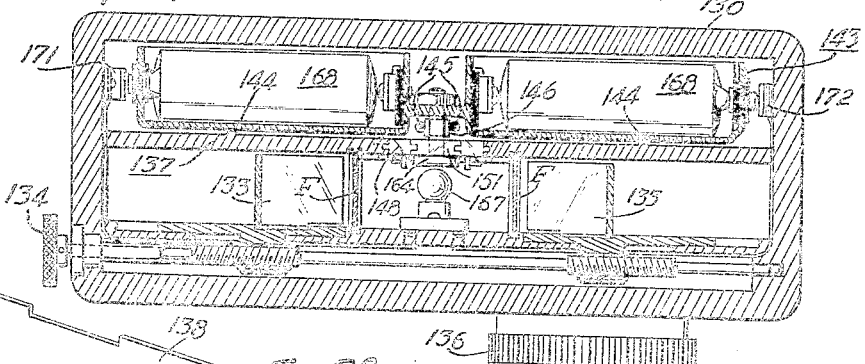
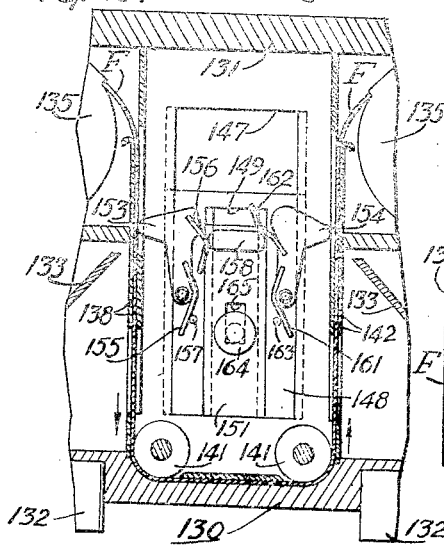
Inventor:
Joseph F. Jaros
by his Attorneys
Howson & Howson May 31, 1955
J. F. JAROS
2,709,401
STEREOSCOPIC CAMERA AND VIEWER
Filed Aug. 1, 1952
6 Sheets-Sheet 6
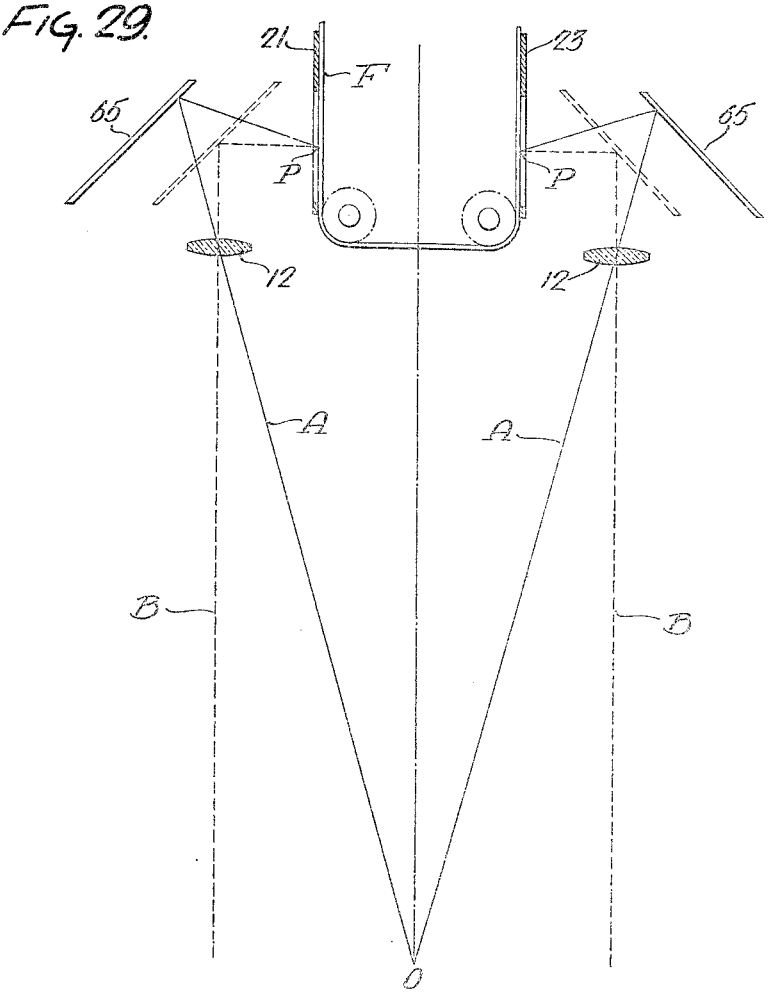
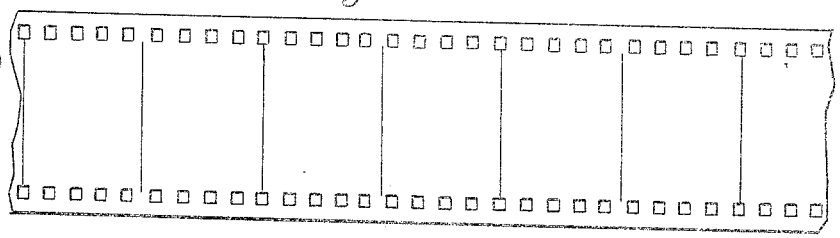
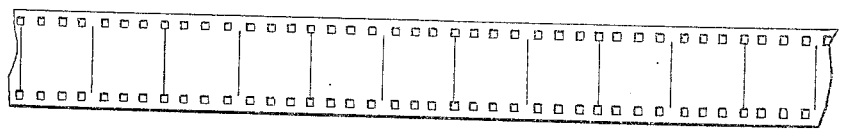
Inventor:
Joseph F. Jaros
by his Attorneys
Howson & Howson United States Patent Office 2,709,401
Patented May 31, 1955

2,709,401

STEREOSCOPIC CAMERA AND VIEWER

Joseph F. Jaros, Chicago, Ill., assignor of one-half to Harry N. Seversen, Ardmore, Pa.

Application August 1, 1952, Serial No. 302,113

12 Claims. (Cl. 95—18)

The present invention relates to new and useful improvements in stereoscopic viewers and cameras and more particularly to new and useful improvements in strip film advancement, positioning and focusing means for stereoscopic devices.

The principal object of the present invention is to provide a novel stereoscopic camera and viewer wherein the pairs of stereoscopic pictures are taken on strip film and the distance between pictures of each pair is equal to the average interpupillary distance so that the pictures may be viewed without the necessity of cutting and remounting or transposing the pictures in the strip of film.

Another object of the present invention is to provide novel film advancement mechanism for stereoscopic devices which will advance the film step by step a predetermined distance regardless of the position of the perforations in the film.

Another object of the present invention is to provide a novel stereoscopic device wherein the film advancement mechanism may be actuated manually or automatically as desired.

A further object of the present invention is to provide a novel stereoscopic device of the type described having a relatively simplified means for focusing, centering and laterally transposing stereoscopic photographic images at varying distances of the subject from the camera.

A still further object of the present invention is to provide a novel stereoscopic device having the features and characteristics set forth which is of relatively simplified construction, may be manufactured easily and cheaply and is entirely efficient and effective in operation and use.

These and other objects of the present invention and the various features and details of the operation and construction thereof are hereinafter more fully set forth and described with reference to the accompanying drawings, in which:

Fig. 1 is a sectional plan view of a stereoscopic device made in accordance with the present invention;

Fig. 2 is a longitudinal sectional view taken on line 2—2, Fig. 1 illustrating the focusing means for the stereoscopic device;

Fig. 3 is a fragmentary sectional view taken on line 3—3, Fig. 1 illustrating the film advancement mechanism;

Fig. 4 is a fragmentary sectional view taken on line 4—4, Fig. 3;

Fig. 5 is a fragmentary sectional view taken on line 5—5 Fig. 3, illustrating the mounting means for the film receptacle;

Fig. 6 is an enlarged fragmentary sectional plan view illustrating the film advancement mechanism in an operative position;

Fig. 7 is an enlarged fragmentary sectional view taken on line 7—7, Fig. 6 illustrating the means for guiding reciprocal movement of the film advancement mechanism;

Fig. 8 is a fragmentary sectional view taken on line 8—8, Fig. 6 illustrating the means for actuating the film advancement mechanism;

Fig. 9 is an enlarged fragmentary plan view partially in section of a portion of the means for actuating the film advancement mechanism;

Fig. 10 is an enlarged fragmentary sectional view of the focusing mechanism taken on line 10—10, Fig. 2;

Fig. 11 is a fragmentary sectional plan view of a modified form of film advancement mechanism for the stereoscopic device of the present invention;

Fig. 12 is an enlarged fragmentary sectional plan view of the film advancement mechanism illustrated in Fig. 11 during advancement of the film;

Fig. 13 is a fragmentary sectional view taken on line 13—13, Fig. 11;

Fig. 14 is a fragmentary sectional view taken on line 14—14, Fig. 11;

Fig. 15 is a fragmentary sectional view taken on line 15—15, Fig. 12;

Fig. 16 is a fragmentary sectional view taken on line 16—16, Fig. 14;

Fig. 17 is a sectional plan view of another modified form of film advancement mechanism for the stereoscopic device of the present invention;

Fig. 18 is a transverse sectional view taken on line 18—18, Fig. 17;

Fig. 19 is a fragmentary sectional view taken on line 19—19, Fig. 18;

Fig. 20 is a sectional view illustrating the escapement means for the film advancement mechanism in Fig. 17;

Fig. 21 is a sectional plan view taken on line 21—21, Fig. 20;

Fig. 22 is a sectional view taken on line 22—22, Fig. 18 illustrating means for preventing the advancement mechanism from being actuated manually in the reverse direction.

Fig. 23 is a sectional plan view illustrating further modified form of film advancement mechanism;

Fig. 24 is a longitudinal sectional view taken on line 24—24, Fig. 23;

Fig. 25 is an enlarged inverted sectional plan view illustrating the friction pawls which engage the film and advance the same;

Fig. 26 is a fragmentary view similar to Fig. 25 illustrating the friction pawls in an operative position;

Fig. 27 is a transverse sectional view taken on line 27—27, Fig. 23 illustrating the film advancement mechanism and means for actuating same;

Fig. 28 is a perspective view of a guide plate for the film when the device is used as a camera to prevent transmission of light across the device;

Fig. 29 is a diagram illustrating the trigonometric solution of the optical problem involved in the present invention when using this device as a camera;

Fig. 30 is a face view of 35 mm. film illustrating the placement of the pictures thereon; and Fig. 31 is a face view of a 16 mm. film illustrating the placement of the pictures thereon.

Referring more specifically to the drawings, in Figs. 1 to 10, inclusive, there is illustrated one form of a stereoscopic device made in accordance with the present invention. The stereoscopic device comprises an enclosed housing 10 of generally rectangular shape having a removable rear wall 11 which permits access to the interior of the housing 10. When the device is used as a camera a pair of lenses, matched for stereoscopic photographs, is mounted on the front wall of the housing as shown in Fig. 1 and the usual shutter mechanism (not shown) is provided for the purpose of taking pictures. Alternatively, when the device is used as a viewer a pair of viewing lenses (not shown) is mounted in the front wall of the housing in place of the lenses 12.

In accordance with the present invention, the stereoscopic device is adapted for the use of strip film F, either 16 or 35 mm., according to the particular design of the device, and the film is carried by the usual type spools S, S. Each of the spools has a cylindrical casing 13 provided for it and the spools are rotatably mounted interiorly of the casings as shown in Fig. 3. The cylindrical casings 13 are mounted in slots 14, 14 in the base of the housing 10 and are prevented from rotation by square shafts 15, 15 which are engaged in the slots. Resilient leaf spring members 16, 16 secured to the removable rear wall 11 of the housing engage the casings 13 as shown in Figs. 1 and 3 and maintain the casings in their forward limit position as defined by the ends of the slots 14, 14. An elongated opening 17 extending substantially the full length of the casings provides an entrance or exit in the casing for the film.

The spools S, S are mounted adjacent the rear wall of the housing 10 and are equally disposed at opposite sides of the transverse axis of the housing. The film strip is initially carried by the left hand spool, with respect to Fig. 1 and is wound onto the right hand spool. The film follows a generally U-shaped path of travel from the left to the right hand spool and passes over a pair of guide rollers 18, 18 at the forward end of the housing 10. The path of travel of the film from the left hand spool to the guide rollers is directed by a pair of guide members 21 and 22 which engage the outer and inner face respectively of the film. In a similar manner the path of travel of the film from the guide rollers to the right hand or rewind spool is directed by guides 23 and 24 which engage the outer and inner face, respectively, of the film strip. The guides 21, 22, 23, and 24 extend transversely of the housing 10 from the casings 13 to the guide rollers 18 and are carried by the housing as shown in Fig. 2.

Drive means are provided in the present invention to advance the film after viewing or taking a picture so that the film will be in position for another picture to be viewed or taken. The drive means may be motor driven, manually operated or driven by weights. In the present embodiment of the invention the film is motor driven by a spring motor which operates to drive the right hand or rewind spool in the clockwise direction, with respect to Fig. 1, and cause the strip of film to be drawn through the stereoscopic device. The spring motor is of the conventional type and is best illustrated in Fig. 3 of the drawings. With reference to Fig. 3, the spring motor comprises a flat spiral torsion spring 25 which has one end secured to a cap 26 secured to the housing 10 while the other end is secured to a spindle 27 which in turn engages the right hand spool S. The spindle 27 has a slot 28 in the lower end thereof which engages a pin 29 extending transversely of the spool and causes rotation of the spool upon similar rotation of the spindle. In order to rewind the spring motor, a winding knob 32 carried by the spindle 27 is elevated removing the spindle from engagement with the spool thereby permitting the spring to be wound without rotating the spool. A coil spring 33 encircles the central portion of the spindle and prevents the winding knob from rotating in the wrong direction.

In accordance with the present invention, actuation of the drive mechanism is controlled to cause the film strip to be advanced a predetermined distance each time the drive mechanism is actuated. In the present embodiment of the invention a pair of pawls 35 and 36 are adapted to engage perforations in the film strip and control the film advancement. The pawls 35 and 36 are mounted on a crosshead 37 for limited back and forth movement with the crosshead transversely of the housing 10.

With reference to Figs. 1 and 2, a shallow recess 38 is provided in the bottom wall of the housing 10 interiorly of the stereoscopic device and the crosshead 37 is mounted in the recess 38 for limited sliding movement transversely of the housing 10. In the illustrated embodiment of the present invention a tongue and groove, as shown in Fig. 2 of the drawings, is provided for slidably mounting the crosshead in the recess. Front and rear walls 38a and 38b, respectively, in the recess serve as stops to limit the sliding movement of the crosshead. Mounted on the crosshead 37 for movement with the crosshead and also limited sliding movement with respect to the crosshead is a member 39 which causes engagement and disengagement of the pawls 35 and 36 with the film strip. The member 39 is mounted in a groove extending lengthwise of the crosshead for sliding movement by means of a tongue and groove, as shown in Fig. 2. The member 39 has a transverse length greater than the transverse length of the crosshead 37 and thus will engage the front and rear walls 38a and 38b of the recess 38 during transverse movement thereof prior to engagement of the recess walls by the crosshead 37.

The pawls 35 and 36 are pivotally mounted on trunnions 42 and 43, respectively, carried at the left and right hand sides, respectively, of the crosshead 37 as shown in Figs. 1 and 6. The pawl 35 extends toward the forward end of the housing 10 and has a pair of integral leaf springs 44 and 45 at opposite sides thereof. The leaf spring 44, which is positioned at the outer side of the pawl 35, is continuously in engagement with a pin 46 projecting upwardly from the crosshead 37 and urges the pawl 35 toward the centerline of the housing out of engagement with the film strip. A second pin 47 carried by the member 39 is operable to be forced into engagement with the leaf spring 45 and overcome the tendency of the leaf spring 44 to maintain the pawl out of engagement with the film strip. When the pin 47 engages the leaf spring 45 the pawl 35 is forced into engagement in one of the perforations of the film strip.

As described above the pin 47 is mounted on the member 39 while the pin 46 is carried by the crosshead 37 and thus the pin 47 will have relative movement with respect to the pawl 35. When the crosshead 37 is in its extreme rearward position against the rear wall 38b of the recess 38 the pin 47 is in its forward limit position with respect to the pawl 35 and is in engagement with the spring 45 thereby forcing the pawl 35 into engagement with the film strip, as shown in Fig. 1. During the forward movement of the crosshead 37 and member 39 the pin 47 is maintained in engagement with the spring 45. When the member 39 engages the forward wall 38a of the recess 38 the forward movement of the member 39 is stopped and the pawl 35 moves forward with respect to the pin 47 thereby removing the pin 47 from pressure applying relationship with the spring 45. In this relative position of the crosshead 37 and member 39 the spring 44 urges the pawl 35 out of engagement with the film strip.

The pawl 36 mounted on the trunnion 43 at the right hand side of the crosshead 37 is constructed in a manner very similar to the pawl 35 and projects rearwardly in the housing. The pawl 36 has a pair of leaf springs 48 and 49 formed as integral parts thereof on its outer and inner surfaces, respectively, which are adapted to engage pins 52 and 53 mounted on the crosshead 37 and member 39, respectively. The operation of the pawl 36 is the reverse of the operation of the pawl 35. During forward movement of the crosshead 37 and member 39 the pin 53 is out of engagement with the spring 49, as shown in Fig. 1, and the pin 52 and leaf spring 48 maintain the pawl 36 out of engagement with the film strip. At the end of the forward movement of the member 39, and while the crosshead 37 is still being moved toward the front of the housing the pin 53 is forced into pressure applying relationship with the spring 49 thereby urging the pawl 36 into engagement with the film strip. This occurs simultaneously with the removal of the pawl 35 from engagement with film strip and thus, at all times, either the pawl 35 or the pawl 36 is in engagement with the film strip. At the end of the rearward movement of the crosshead 37 and member 39 the pawl 36 is removed from engagement with the film strip and, simultaneously, the pawl 35 is forced into engagement therewith.

As described above, the spring motor exerts a continual pull on the film strip and serves to drive the film strip while, at the same time, the film strip is in engagement with one of the pawls 35 and 36. When the crosshead 37 and member 39 are in the position shown in Fig. 1 the film strip is in engagement with the pawl 35 and tends to pull the crosshead 37 and member 39 towards the forward end of the housing whereupon the pawl 35 is removed from engagement with the film strip and the pawl 36 is forced into engagement therewith. The film strip then tends to pull the crosshead 37 and member 39 toward the rear of the housing completing one cycle of operation.

From the above description of the operation of the spring motor and crosshead, it is apparent that by providing latch mechanism to control movement of the crosshead the film advancement may be limited and controlled. In the present embodiment of the invention the latch mechanism is manually actuated and comprises a slide 54 slidably mounted in a slot 55 in the bottom of the housing 10 for limited longitudinal movement with respect to the housing 10. The slide has a button or operating lever 56 extending downwardly therefrom exteriorly of the housing for manual actuation by the user of the device and may be actuated between right and left hand limit positions, as shown in Fig. 8. Extending upwardly from the slide 54 is a pair of resilient stop members 57 and 58 which are capable of being engaged by a downwardly projecting lug 59 carried by the crosshead 37.

When the slide 54 is in its left hand position, with respect to Fig. 6, the stop 58 is in the path of travel of the lug 59 and is adapted to engage the lug 59 and prevent rearward movement of the crosshead with respect to the housing. In a similar manner, when the slide 54 is in its right hand position, with respect to Fig. 6, the stop 57 is in the path of travel of the lug 59 and will maintain the crosshead 37 in its extreme rearward position in the housing. The distance between the stops 57 and 58 is less than the width of the lug 59 so that there is no intermediate position wherein a stop is not in the path of travel of the lug 59. A spring loaded detent ball 62 is carried by the slide 54 as illustrated in Fig. 9 and is adapted to engage detents 63 and 64 in the housing 10 to resiliently maintain the slide 54 in its left and right hand limit positions, respectively. By this construction it will be observed that when the slide 54 is in its right hand limit position the crosshead 37 and member 39 are maintained in their rearward limit position with respect to the housing and when the slide 54 is in its left hand position the crosshead 37 and member 39 are maintained in their extreme forward limit position with respect to the housing.

Moving the slide 54 from the right to the left limit position will permit the crosshead 37 and member 39 to be pulled to their forward limit position in the housing 10 and returning the slide 54 to the right hand position will permit the crosshead 37 and member 39 to be pulled to their rearward limit position in the housing by the film. This is one complete cycle of operation of the film advancement mechanism in this embodiment of the present invention and operates to advance the film strip the desired distance. For example, when using 35 mm. film the film strip is advanced a distance equal to the width of two pictures during one complete cycle of operation of the film advancement mechanism, which distance is equal to nine perforations in the film strip, as shown in Fig. 30. When using 16 mm. film the distance is equal to seven perforations. In both of these cases this is an odd number of perforations and thus upon disengagement of the pawl 35 from the film strip and engagement of the pawl 36 with the film strip at the forward limit position of the crosshead, the film strip advances a distance equal to the distance between adjacent perforations while out of engagement with the pawls.

A very important feature of the present invention and one which should be used in conjunction with the film advancement mechanism of the present invention is the provision of focusing means to focus an image on the film at exactly the same spot regardless of the distance of the object from the camera. It is readily apparent that if the film strip is to be viewed without cutting and remounting the pictures in this strip of film, the distance between each pair of pictures on the film must be equal to the average interpupillary distance no matter how near or how far the object is from the camera when the picture is taken. The lenses 12, 12 used for taking pictures are fixed with respect to the housing and positioned behind each lens 12, 12 is a reflector 65, 65 disposed at a 45 degree angle to the axis of the lens.

The reflectors 65, 65 may be moved simultaneously and in opposite directions longitudinally of the housing 10 along an axis positioned at right angles to the axes of the lenses to focus the camera. For example, when the object is a long distance away from the camera the light rays from the object pass through the lens substantially parallel to the optical axis of the lens and the reflector must be positioned on the optical axis of the lens to reflect the light rays from the object to the film as shown in full lines in Fig. 1. Alternatively, when the object is close to the camera the reflector must be in the position shown in broken lines in Fig. 1 to focus the light rays from the object to the film.

In accordance with the present invention therefore, the reflectors 65, 65 are each mounted on a carriage 66 which in turn is mounted on tracks 67, as shown in Fig. 10, for lateral movement with respect to the housing 10 and to the optical axis of the lenses. Each carriage 66 in turn has a threaded sleeve 66a fixedly secured to it through which a shaft 68 extends. The shaft 68 extends the entire length of the housing 10 and has oppositely threaded portions 69, 69 thereon engaged by the threaded sleeves 66a. By this construction, upon rotation of the shaft 68 in one direction the reflectors 65 will be moved laterally of the housing away from the optical axis of the lenses and rotating the shaft 68 in the opposite direction will move the reflectors inwardly toward each other. A focusing knob 72 secured to an end of the shaft 68 exteriorly of the housing 10 permits rotation of the shaft 68 by the user of the device.

A modified form of film advancement mechanism for the present invention is illustrated in Figs. 11 to 16, inclusive, of the drawings. The lenses, focusing means, drive means, film guides and housing are substantially the same as shown in the embodiment in Figs. 1 to 10, inclusive, of the drawings and the only difference in this embodiment is in the film advancement mechanism.

With reference to Figs. 11, 12 and 13 of the drawings, a recess 75 is provided centrally of the base of the housing extending transversely thereof, in which a crosshead 76 is mounted for limited sliding movement transversely of the housing, for example, by means of a tongue and groove. Sliding movement of the crosshead 76 is limited by the front and rear walls 75a and 75b respectively, of the recess 75. A groove 77 is provided in the upper surface of the crosshead 76 and slidably mounts a member 78 by means of a tongue and groove as illustrated in Fig. 14. The member 78 is carried by the crosshead 76 during forward and rearward movement of the crosshead and is substantially longer than the crosshead to contact the front and rear walls of the recess prior to engagement of the walls by the crosshead and remain stationary while the crosshead is completing transverse sliding movement in the housing 10.

Pivotally mounted on the left and right hand sides, respectively, of the crosshead 76 is a pair of pawls 81 and 82 which engage perforations in the film strip. The pawl 81 is mounted for pivotal movement at the forward left hand corner of the crosshead 76, with respect to Fig. 11 and has an arcuate slot 83 therein which engages a pin 84 to limit pivotal movement of the pawl 81. The pawl 81 has a generally circular configuration with a projection 85 on the outer side thereof actuatable to engage the film, and spaced apart parallel cam surfaces 86 along the inner edge thereof which pivotally actuate the pawl. In a similar manner the pawl 82 is pivotally mounted on the crosshead 76 at the rear right hand corner thereof, as illustrated in Fig. 11, and is provided with an arcuate slot 87 adapted to engage a pin 88 carried by the crosshead to limit pivotal movement of the pawl 82. The configuration of the pawl 82 is similar to the configuration of the pawl 81 and has a film engaging projection 89 on the outer edge thereof and parallel spaced apart cam surfaces 91 along the inner edge thereof.

The member 78 carries a pair of leaf springs 93 and 94 along each side thereof. The leaf springs 93 are secured to the member 78 at the rear left hand corner thereof and projected forwardly along the left hand side of the member. This pair of leaf springs engages the cam surface 86 on the pawl 81 when the member 78 is in its forward position on the crosshead 76 and maintains the pawl 81 in engagement with the perforations in the film strip F. In this position of the pawl 81 the film strip exerts a force on the pawl 81 and tends to pull the crosshead 76 and member 78 toward the forward edge of the recess 75. The member 78 engages the forward edge 75a of the recess 75 prior to engagement of the forward edge by the crosshead 76 and thus the member 78 is moved rearwardly with respect to the crosshead 76 removing the leaf springs 93 from engagement with the pawl 81 and permitting free rotation of the pawl 81.

The pair of leaf springs 94 are mounted at the forward right hand corner of the member 78 and extends rearwardly along the right hand edge thereof. In the rearward limit position of the member 78 with respect to the crosshead 76 the leaf springs 94 are in engagement with the cam surfaces 91 on the pawl 82 and maintain the pawl 82 in engagement with the film strip. In this position the film strip tends to pull the crosshead 76 and member 78 toward the rear edge of the recess 75. Upon engagement of the member 78 with the rear edge 75b of the recess 75 the member 78 is moved to its forward limit position with respect to the crosshead 76 and the leaf springs 94 are removed from engagement with the pawl 82 permitting free rotation of the pawl 82. At the same time the leaf springs 93 are forced into engagement with the pawl 81 causing the pawl 81 to engage the film strip.

In accordance with the present invention, latch mechanism is provided to control actuation of the crosshead 76 and member 78 thereby controlling the advancement of the film. To this end, a slot 96 is provided in the base of the housing, in which a slide 97 is slidably mounted for limited longitudinal movement with respect to the housing. An operating handle or knob 98 extends downwardly from the slide 97 exteriorly of the housing to permit manual actuation of the slide 97 between right and left hand limit positions with respect to Fig. 11. Secured to the lower surface of the crosshead 76 is a resilient latch 101, formed as illustrated in Figs. 11 and 12 and provided with an enlarged head portion which projects rearwardly beyond the crosshead 76. The head portion of the latch 101 is operable to engage a pin 102 secured to the housing of the stereoscopic device directly above the slide 97 and maintain the crosshead 76 in its extreme rearward position. Secured to the upper surface of slide 97 and extending longitudinally thereof is a resilient latch actuating member 103 actuatable upon movement of the slide 97 to disengage the latch 101 from the pin 102 thereby permitting the crosshead 76 and member 78 to be actuated by the film strip. The latch actuating member 103 normally engages one side of the head of the latch member 101 and upon actuation of the slide to its left hand limit position disengages the head from the pin 102. During the rearward movement of the crosshead 76 the end of the latch 101 engages the side edge of the actuating member 103 and forces it rearwardly as shown in Fig. 16 to permit the latch to engage the pin 102. Moving the slide 97 to its right hand position with respect to Fig. 11 causes the actuating member 103 to engage the side of the latch member 101 resetting the device for a second cycle of operation.

To operate the stereoscopic device of the present embodiment a spool of film is deposited in the left hand film container. The drive spring is wound to exert tension on the film strip. The crosshead 76 and member 78 are in their extreme rearward position with respect to the housing and the pawl 81 is in engagement with the film strip. Disengaging the latch 101 from the pin 102 will permit the film strip to pull the crosshead 76 and member 78 to their forward limit position in the housing whereupon the pawl 81 is disengaged from the film strip and the pawl 82 engages the film strip. The film strip will then pull the crosshead 76 and member 78 to their rearward limit position in the housing and the latch 101 will engage the pin 102 and maintain the crosshead in the rear limit position. Engagement of the pawl 81 with the film strip will prevent movement of the film strip until the latch 101 is again released.

A further embodiment of the present invention is illustrated in Figs. 17 to 22, inclusive, of the drawings. In this embodiment of the invention the film strip F follows a generally U-shaped path of travel and is directed toward the forward end of the housing by guides 105 and toward the rear of the housing by guides 106. The film strip may be either 16 or 35 mm. according to the size of the camera or viewer, and is perforated along its lower edge for engagement by a plurality of film sprockets 107. All of the sprockets 107 are positioned adjacent the forward end of the housing and serve to direct the path of travel of the film strip while two other sprockets 107 are positioned in engagement with the film strip at the midpoint of the forward and rearward path of travel of the film strip, as illustrated in Fig. 17.

Each of the sprockets is carried by a trunnion 108 pivotally mounted in the housing as illustrated in Figs. 18 and 19. Fixedly secured to each trunnion 108 beneath the sprockets 107 is a pinion 109, and each pinion 109 is positioned in engagement with a drive gear 111. The drive gear 111 in turn is mounted on a shaft 112 which extends vertically of the stereoscopic device and projects downwardly from the lower wall of the housing. By this construction, rotation of the shaft 112 in the clockwise direction with respect to Fig. 17 will cause counterclockwise rotation of each of the pinions 108 and will advance the film through the housing in the direction indicated in Fig. 17.

Drive means are provided in the present invention to advance the film after viewing or taking a picture so that the film will be in position for another picture to be viewed or taken. The drive means may be motor driven, manually operated or driven by weights. In the present embodiment of the invention, the shaft 112 is rotated by means of a knob 113 secured to the lower end of the shaft. A ratchet 114 is secured to the shaft 112 immediately below the lower wall of the housing and is engaged by a pawl 115 secured to the lower wall of the housing, as illustrated in Fig. 22. The ratchet 114 and pawl 115 permit only clockwise rotation of the shaft, with respect to Figs. 17 and 22, and prevent the film from being driven in the wrong direction through the housing.

In accordance with the present invention means are provided to limit advancement of the film to a predetermined distance each time the drive means are actuated. To this end a ratchet 117, formed as illustrated in Fig. 21 is fixedly secured to the shaft 112 interiorly of the housing and is adapted to be engaged by a pair of pawls 118 and 119. The pawls 118 and 119 in turn are mounted at one end of a leaf spring 121 which has its other end secured to the housing as indicated at 122 in Fig. 18. The pawls 118 and 119 are mounted in spaced vertical relation and are actuatable vertically by means of a plunger 123 which engages the lower portion of the leaf spring 121. In the lower position of the pawls, the pawl 119 engages a tooth on the ratchet 117, as illustrated in Fig. 17, and prevents rotation of the ratchet and shaft 112. Forcing the plunger 123 upwardly will disengage the pawl 119 from the ratchet and cause the pawl 118 to engage the peripheral surface of the ratchet. The ratchet may then rotate 90 degrees to the position illustrated in Fig. 21 whereupon the pawl 118 engages the tooth on the ratchet and prevents further rotation thereof. Releasing the plunger 123 will disengage the pawl 118 from the ratchet and permit the ratchet to be rotated 90 degrees until the tooth on the ratchet engages the pawl 119. This is a complete cycle of operation of the film actuating mechanism and advances the film the desired distance. It will be readily discerned that with motor-driven means, as in Figs. 1 to 10, each successive upward thrust and release of plunger 123 would result in a complete cycle of operation without recourse to knob 113.

Figs. 23 to 28 inclusive of the drawings illustrate a further embodiment of the present invention wherein the film is driven by means of a spring motor and the film actuating mechanism frictionally engages the film and is actuated by means of a weighted carriage. With reference to Figs. 23 and 24, the stereoscopic device is shown for use as a viewer and comprises a housing 130 having a removable rear wall 131 to provide access to the interior of the housing. A pair of lenses 132, 132 are provided in the front wall of the housing and reflectors 133, 133 mounted behind the lenses and actuated laterally by a focusing knob 134, in the manner described in Figs. 1 to 10, inclusive, permit focusing of the stereoscopic device and pupillary adjustment in conjunction with adjustment of the lenses. The film strip is mounted on spools (not shown) which in turn are carried in film containers 135, 135. A spring motor, similar to the spring motor described in the embodiment illustrated in Figs. 1 to 10 of the drawings drives the rewind spool which is mounted in the right hand film container with respect to Fig. 23. The spring motor is wound by means of a knob 136 at the bottom of the housing 130.

A partition 137 divides the housing in the upper and lower compartments and the film strip F is passed through the lower compartment. With reference to Fig. 25, the film containers 135, 135 are mounted adjacent the removable rear wall of the housing in the lower compartment and a pair of guide members 138 directs the film from the left hand receptacle to the forward end of the housing. The film passes over a pair of rollers 141, 141, adjacent the forward edge of the housing and is directed rearwardly in the housing by a pair of guide members 142.

Slidably mounted in the upper compartment of the housing is a carriage 143 which may be actuated back and forth therein between predetermined limit positions by tilting the housing 130 in the back and forth directions. The carriage is supported on a pair of ribs 144, 144, formed as integral parts of the partition 137 and extending upwardly therefrom transversely of the housing. In addition, a pair of guide rods 145, 145 extend transversely of the housing and engage rollers 146, 146 mounted on the lower edge of the carriage 143 to prevent twisting movement of the carriage.

An opening 147 is provided centrally of the partition 137 extending transversely of the housing in which the film actuating mechanism is slidably mounted. The film actuating mechanism comprises a crosshead 148 slidably engaged by the opening and actuatable transversely of the housing between predetermined limit positions defined by the ends of the opening 147. The crosshead 148 in turn has a slot or opening 149 therein which mounts a slide 151 as illustrated in Fig. 25. The slide 151 is mounted in the crosshead 148 for limited longitudinal movement with respect to the crosshead 148.

Pivotally mounted at opposite sides of the crosshead 148 on the lower surface thereof is a pair of pawls 153 and 154 which are adapted to frictionally engage the film strip. The pawl 153 mounted on the left hand side of the carriage, with respect to Fig. 25, has a pair of leaf springs 155 and 156 formed integrally therewith and the leaf spring 155 engages a pin 157 carried by the crosshead and normally urges the pawl 153 out of engagement with the film strip. The leaf spring 156 is adapted to be engaged by a lug 158 projecting downwardly from the slide 151 and overcome the pressure of the spring 155 to force the pawl 153 into engagement with the film strip. In a similar manner, the pawl 154 has a pair of leaf springs 161 and 162 formed integrally therewith and the leaf spring 161 engages a pin 163 carried by the crosshead and normally urges the pawl 154 out of engagement with the film strip. The spring 162 will overcome the pressure of the spring 161 upon engagement by the lug 158 and force the pawl 154 into engagement with the film strip.

The slide 151 is mounted for limited longitudinal movement with respect to the crosshead 148 and is actuated by the carriage transversely of the housing, by a pin 164 secured to the carriage and extending through a slot 165 in the slide 151. In the extreme forward limit position of the slide 151 with respect to the crosshead 148, the lug 158 engages the leaf spring 156 and forces the pawl 153 into engagement with the film strip. By tilting the housing 130 and causing the carriage to move toward the rear of the housing the lug 158 on the slide engages the leaf spring 162 forcing the pawl 154 into engagement with the film strip and the leaf spring 156 is disengaged by the lug 158 permitting the pawl 153 to be removed from engagement with the film strip. The film strip will then pull the crosshead 148 and slide 151 to the rear of the opening 147.

In order to advance the film strip the desired distance the carriage 143 and crosshead 148 must be moved to their extreme rearward limit position in the housing and then forward again. Tilting the housing so that the carriage moves rearwardly therein will cause the pawl 154 to engage the film strip and the film strip will pull the crosshead 148 to the rear of the opening 147. The pawl 154 frictionally engages the film strip and prevents the film strip from moving when the crosshead 148 abuts the rear of the opening 147. Tilting the housing 130 in the forward direction so that the carriage moves toward the forward end of the housing will engage the pawl 153 with the film strip and remove the pawl 154 from engagement with the film strip. The spring motor will then cause the film strip to pull the crosshead toward the forward end of the opening 147 and the movement of the film will be limited by the movement of the crosshead 148.

In the present embodiment of the invention the stereoscopic device is constructed for use as a viewer and the inner film guide of each pairs of guides 138 and 142 has an opening in the forward end thereof to permit light rays from a source of light 167 to illuminate the frames of the film strip positioned in front of these openings. When the device is used as a camera the inner guides are formed as illustrated in Fig. 28 and prevent light rays from passing transversely of the housing. The source of light 167 is energized when the carriage 143 is in its forward position in the housing by means of a plurality of batteries 168 carried by the carriage. The carriage engages electric contact elements 171 and 172, as illustrated in Fig. 23, when it is in its forward limit position and completes an electric circuit to the source of light 167.

Fig. 29 is a diagrammatic view illustrating trigonometrically that light rays from an object any distance away from the camera may be centered and focused on the film aperture by linear movement of the reflectors inclined forwardly at a constant angle of 45 degrees to the focal axis of their respective lens so as to substantially maintain the angle of incidence of the central subject rays on the film apertures equal to that of the exemplary ray on each of their paired, respective lenses when separated at a predetermined ratio of their base-lens distance to their focal length of 1.88 to 1.96. In the diagram the full lines A, A are exemplary rays from an object O close to the camera passing through the center of the lenses 12, 12. The reflectors 65, 65 are in the position indicated in full lines and focus the object on the film. The light rays A, A which pass through the center of the lenses are directed to the aperture centers P, P of the film. The broken lines B, B are exemplary rays from an object an infinite distance from the camera passing through the lens centers. When the reflectors 65, 65 are in the position indicated in broken lines in Fig. 29 the object will be focused on the film and in addition, the rays B, B passing through the center of the lenses will be focused at the aperture centers P, P.

From the foregoing it will be observed that the present invention provides a novel stereoscopic camera and viewer wherein the pairs of stereoscopic pictures are taken on strip film and the distance between pictures of each pair is equal to the average interpupillary distances so that the pictures may be viewed without the necessity of cutting and remounting or transposing the pictures in the strip of film. In addition, it will be observed that the present invention provides a novel stereoscopic device wherein the film is advanced step by step a predetermined distance regardless of the position of the perforations in the film.

While particular embodiments of the present invention have been illustrated and described herein it is not intended to limit the invention to such a disclosure and changes and modifications may be incorporated and embodied therein within the scope of the following claims.

I claim:

1. In a stereoscopic device comprising a housing for a roll of strip film, drive means to exert tension on said film to advance the same through the housing, spaced parallel film directing members mounted vertically in said housing to direct the film strip in forward and rearward paths of travel transversely of the housing, film engaging means mounted in said housing between said directing members and including a plurality of elements actuatable alternatively into engagement with the film strip and movable thereby with the advancement of said film strip as said strip is moved in said forward and rearward paths of travel by said drive means, and mechanism operatively associated with said film engaging means actuatable to prevent movement of said film engaging means and limit advancement of the film strip by said drive means to successive equal steps.

2. In a stereoscopic device comprising a housing for a roll of strip film, drive means to exert tension on said film to advance the same through the housing, spaced parallel film directing members mounted vertically in said housing to direct the film strip in forward and rearward paths of travel transversely of the housing, film engaging means mounted in said housing between said directing members and including a plurality of elements actuatable alternatively into engagement with the film strip and movable thereby with the advancement of said film strip as said strip is moved in said forward and rearward paths of travel by said drive means, stop means positioned between said directing members for engagement by said film engaging means to limit movement thereof by said film strip, and mechanism operatively associated with said film engaging means actuatable into engagement with said stop means to prevent movement of said film engaging means and limit advancement of the film strip by said drive means to successive equal steps.

3. In a stereoscopic device comprising a housing for a roll of strip film, guide means to direct the film strip in forward and rearward paths of travel transversely of the housing, said guide means having a pair of spaced film apertures adjacent the film, drive means in said housing arranged to engage the film strip and exert tension thereon to advance the film strip through the housing, film advancement mechanism mounted in said housing in engagement with the film strip and including a plurality of elements actuatable alternatively into engagement with the film strip, said advancement mechanism being movable by said film strip under the tension exerted on the film strip by the drive mechanism as said strip is moved in said forward and rearward paths of travel, and latch means positioned in the path of travel of said film advancement mechanism operable to engage the same to prevent movement thereof and actuatable selectively to a position momentarily out of the path of travel of the film advancement mechanism to permit limited movement thereof to successively position portions of said film strip with respect to said spaced film apertures in said guide means.

4. In a stereoscopic device comprising a housing for a roll of strip film, guide means to direct the film strip in forward and rearward paths of travel transversely of the housing, said guide means having a pair of spaced film apertures adjacent the film, a pair of lenses mounted in the forward surface of said housing with their optical axes parallel to the forward and rearward paths of travel of the film strip, a reflector positioned adjacent each lens inclined forwardly in the housing at an acute angle to the optical axes of the lenses to direct light rays passing through the lenses to the film apertures, drive means in said housing arranged to engage the film strip and exert tension thereon to advance the film strip through the housing, film advancement mechanism mounted in said housing in engagement with the film strip and including a plurality of elements actuatable alternatively into engagement with the film strip, said advancement mechanism being movable by said film strip under the tension exerted on the film strip by the drive mechanism as said strip is moved in said forward and rearward paths of travel, and latch means positioned in the path of travel of said film advancement mechanism operable to engage the same to prevent movement thereof and actuatable selectively to a position momentarily out of the path of travel of the film advancement mechanism to permit limited movement thereof to successively position portions of said film strip with respect to said spaced film apertures in said guide means whereby said portions are successively exposed to the light rays passing through the lenses to the film apertures.

5. In a stereoscopic device comprising a housing for a roll of strip film operable to be passed through the housing and wound on a rewind spool, drive mechanism to exert tension on the film strip and advance the film strip through the housing, film advancement mechanism comprising a crosshead mounted for sliding movement back and forth in said housing, a plurality of elements on said crosshead actuatable alternatively into engagement with the film strip and movable thereby with advancement of the film strip, and a member slidably mounted on said crosshead for relative movement between predetermined limit positions, means on said member operable in one limit position thereof to force one of said elements into engagement with the film strip and cause the crosshead to be moved by the film strip in one direction in the housing and operable in the other limit position of said member to force another of said elements into engagement with the film strip and cause the crosshead to be moved by the film strip in the other direction in the housing.

6. In a stereoscopic device comprising a housing for a roll of strip film operable to be passed through the housing and wound on a rewind spool, drive mechanism to exert tension on said film to advance the same through the housing, film advancement mechanism comprising a crosshead mounted for sliding movement back and forth in said housing, a plurality of elements on said crosshead actuatable alternatively into engagement with the film strip and movable thereby with advancement of the film strip, a member slidably mounted on said crosshead for relative movement between predetermined limit positions, means on said member operable in one limit position thereof to force one of said elements into engagement with the film strip and cause the crosshead to be moved by the film strip in one direction in the housing and operable in the other limit position of said member to force another of said elements into engagement with the film strip and cause the crosshead to be moved by the film strip in the other direction in the housing, and latch mechanism in engagement with said film advancement mechanism operable to prevent movement of said crosshead and actuatable to a position permitting limited movement thereof.

7. In a stereoscopic device comprising a housing for a roll of strip film operable to be passed through the housing and wound on a rewind spool, drive mechanism including a spring motor in engagement with the rewind spool operable to exert tension on the film strip and advance the film strip through the housing, film advancement mechanism comprising a crosshead mounted for sliding movement back and forth in said housing, a pair of pawls mounted at opposite sides of said crosshead actuatable alternatively into engagement with the film strip and movable thereby with the advancement of the film strip, a member slidably mounted on said crosshead for relative movement between predetermined limit positions, means on said member operable in one limit position thereof to force one of said pawls into engagement with the film strip and cause the crosshead to be moved by the film strip in one direction in the housing and operable in the other limit position of said member to force the other of said pawls into engagement with the film strip and cause the crosshead to be moved by the film strip in the other direction in the housing, and latch mechanism slidably mounted in said housing in engagement with said film advancement mechanism operable to prevent movement of said crosshead and actuatable to a position permitting limited movement thereof.

8. In a stereoscopic device comprising a housing for a roll of strip film operable to be passed through the housing and wound on a rewind spool, drive mechanism including a spring motor in engagement with the rewind spool operable to exert tension on the film strip and advance the film strip through the housing, film advancement mechanism comprising a crosshead mounted for sliding movement back and forth in said housing, a pair of pawls mounted at opposite sides of said crosshead actuatable alternatively into engagement with the film strip and movable thereby with the advancement of the film strip, a member slidably mounted on said crosshead for relative movement between predetermined limit positions, means on said member operable in one limit position thereof to force one of said pawls into engagement with the film strip and cause the crosshead to be moved by the film strip in one direction in the housing and operable in the other limit position of said member to force the other of said pawls into engagement with the film strip and cause the crosshead to be moved by the film strip in the other direction in the housing, and a carriage slidably mounted in said housing for relative transverse movement in engagement with said member and operable by tilting of said housing to actuate said member to control engagement and disengagement of said pawls.

9. In a stereoscopic device comprising a housing for a roll of strip film operable to be passed through the housing, guide means to direct the film strip in forward and rearward paths of travel transversely of the housing, said guide means having a pair of spaced film apertures at opposite sides thereof, a pair of lenses mounted in the forward surface of said housing with their optical axes parallel to the forward and rearward paths of travel of the film strip, a reflector positioned adjacent each lens inclined forwardly at an acute angle to the optical axes of the lenses to direct light rays passing through the lenses to the film apertures, drive mechanism operable to exert tension on said film strip to advance the same through the housing, film advancement mechanism comprising a cross head mounted for sliding movement back and forth in the said housing, a pair of elements mounted at opposite sides of said crosshead actuatable alternatively into engagement with the film strip and movable thereby with the advancement of the film strip, and a member slidably mounted on said crosshead for relative movement between predetermined limit positions, means on said member operable in one limit position thereof to force one of said elements into engagement with the film strip and cause the crosshead to be moved by the film strip in one direction in the housing and operable in the other limit position of said member to force another of said elements into engagement with the film strip and cause the crosshead to be moved by the film strip in the other direction in the housing.

10. In a stereoscopic device comprising a housing for a roll of strip film operable to be passed through the housing and wound on a rewind spool, guide means to direct the film strip in forward and rearward paths of travel transversely of the housing, said guide means having a pair of spaced film apertures at opposite sides thereof, a pair of lenses mounted in the forward surface of said housing with their optical axes parallel to the forward and rearward paths of travel of the film strip, a reflector positioned adjacent each lens inclined forwardly at an acute angle to the optical axes of the lenses, focusing mechanism operable to adjustably position said reflectors simultaneously laterally of the film strip toward and away from each other to focus light rays passing through the lenses on the film strip centrally of the film apertures, drive mechanism including a spring motor in engagement with the rewind spool operable to exert tension on the film strip and advance the film strip through the housing, film advancement mechanism comprising a crosshead mounted for sliding movement back and forth in the said housing, a pair of pawls mounted at opposite sides of said crosshead actuatable alternatively into engagement with the film strip and movable thereby with the advancement of the film strip, a member slidably mounted on said crosshead for relative movement between predetermined limit positions, means on said member operable in one limit position thereof to force one of said pawls into engagement with the film strip and cause the crosshead to be moved by the film strip in one direction in the housing and operable in the other limit position of said member to force the other of said pawls into engagement with the film strip and cause the crosshead to be moved by the film strip in the other direction in the housing, and latch mechanism slidably mounted in said housing in engagement with said film advancement mechanism operable to prevent movement of said crosshead and actuatable to a position permitting limited movement thereof.

11. In a stereoscopic device comprising a housing for a roll of strip film, drive mechanism in said housing to exert tension on the film strip and to advance said film strip, spaced parallel film directing members mounted vertically in said housing to direct the film strip in forward and rearward paths of travel transversely of the housing as said strip is advanced under the tension of said drive mechanism, film engaging means mounted in said housing between said directing members and including a plurality of elements actuatable alternatively into engagement with the film-strip and movable thereby with the advancement of the film strip as said strip is moved in said forward and rearward paths of travel by said drive mechanism, weighted means mounted for free forward and rearward movement within said housing as said housing is tilted forwardly and rearwardly, said weighted means being operatively associated with said film engaging means and being operable during its forward and rearward movements within said housing to engage and stop movement of said film engaging means and thereby limit advancement of the film strip to successive, equal steps with each forward and rearward movement thereof within the housing.

12. In a stereoscopic device comprising a housing for a roll of strip film, guide means to direct the film strip in forward and rearward paths of travel transversely of the housing, said guide means having a pair of spaced film apertures adjacent the film, a pair of lenses fixed in the forward surface of said housing, said lenses separated at a predetermined ratio of base lens distance to focal length and having their optical axes parallel to the forward and rearward paths of travel of the film strip, reflecting means positioned adjacent each lens inclined forward at an angle of 45° to the respective optical axis of their adjacent lens and to the focal plane of their respective aperture to direct light rays passing through the lenses to the film apertures, focusing mechanism operable to adjustably and linearly separate said reflecting means at said constant angle of 45°, drive means in said housing to exert tension on said film strip to advance the same, film engaging means mounted in said housing and including a plurality of elements actuatable alternatively into engagement with the film strip and movable thereby with the advancement of said film strip as said strip is moved in said forward and rearward paths of travel, and limiting means operable to alternately initiate and stop the movement of the film engaging means by the film strip and thereby limit advancement of the film strip to equal successive steps to successively position portions of said film strip with respect to said spaced film apertures in said guide means whereby said portions are successively exposed to the light rays passing through the lenses to the spaced film apertures.

References Cited in the file of this patent

UNITED STATES PATENTS

| | | |
|---|---|---|
| 1,448,526 | Dobbin | Mar. 13, 1923 |
| 2,256,207 | Leitz | Sept. 16, 1941 |
| 2,298,586 | Phillips | Oct. 13, 1942 |
| 2,601,817 | Samoggia | July 1, 1952 |